(12) United States Patent
Breznicky (10) Patent No.: US 9,552,525 B2
(45) Date of Patent: Jan. 24, 2017

(54) NOISE REDUCTION IN BIOMETRIC IMAGES

(71) Applicant: Apple Inc., Cupertino, CA (US)

(72) Inventor: Michal Breznicky, Presov (SK)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/020,886

(22) Filed: Sep. 8, 2013

(65) Prior Publication Data

US 2015/0071502 A1    Mar. 12, 2015

(51) Int. Cl.
*G06K 9/00* (2006.01)

(52) U.S. Cl.
CPC ....... *G06K 9/00885* (2013.01); *G06K 9/00067* (2013.01)

(58) Field of Classification Search
CPC .................. G06K 9/00885; G06K 9/00067
USPC ......................................... 382/124, 274, 275
See application file for complete search history.

(56) References Cited

U.S. PATENT DOCUMENTS

| | | |
|---|---|---|
| 6,330,345 B1 | 12/2001 | Russo et al. |
| 6,556,935 B2 | 4/2003 | Morimura |
| 6,766,040 B1 | 7/2004 | Catalano et al. |
| 6,990,219 B2 | 1/2006 | Morimura et al. |
| 7,072,523 B2 | 7/2006 | Bolle et al. |
| 7,102,673 B2 * | 9/2006 | Kimura ......................... 348/246 |
| 7,358,514 B2 | 4/2008 | Setlak et al. |
| 7,965,874 B2 | 6/2011 | Abiko et al. |
| 8,098,906 B2 | 1/2012 | Shuckers et al. |
| 8,622,302 B2 | 1/2014 | Olmstead |
| 9,195,879 B1 | 11/2015 | Du |
| 2005/0030724 A1 * | 2/2005 | Ryhanen et al. .............. 361/760 |
| 2009/0274343 A1 | 11/2009 | Clarke |
| 2010/0001268 A1 * | 1/2010 | Frye ........................ H01L 22/34 257/48 |
| 2010/0174914 A1 | 7/2010 | Shafir |
| 2012/0106238 A1 * | 5/2012 | John et al. ..................... 365/154 |
| 2013/0315451 A1 | 11/2013 | Franza |
| 2015/0022670 A1 | 1/2015 | Gozzini et al. |
| 2015/0023571 A1 | 1/2015 | Gozzini et al. |

OTHER PUBLICATIONS

U.S. Appl. No. 13/947,572, filed Jul. 22, 2013, Gozzini et al.
U.S. Appl. No. 13/948,097, filed Jul. 22, 2013, Gozzini et al.

* cited by examiner

*Primary Examiner* — John Strege
(74) *Attorney, Agent, or Firm* — Brownstein Hyatt Farber Schreck, LLP (57) ABSTRACT

A system can include a processing device and a biometric sensing device operatively connected to the processing device. The processing device can be configured to remove noise from a biometric image captured by the biometric sensing device using at least two different calibration images. One calibration image characterizes noise of the biometric sensing device at a first signal level while another calibration image characterizes the noise of the biometric sensing device at a second signal level.

21 Claims, 5 Drawing Sheets

NOISE REDUCTION IN BIOMETRIC IMAGES

TECHNICAL FIELD

The present invention relates to electronic devices, and more particularly to a biometric sensing device included in, or connected to an electronic device.

BACKGROUND

Biometric sensing devices are increasingly common in computer or network security applications, financial applications, and surveillance applications. Biometric sensing devices detect or image a unique physical or behavioral trait of a person, providing biometric data that can reliably identify the person. For example, a fingerprint includes a unique pattern of ridges and valleys that can be imaged by a fingerprint sensor. The image of the fingerprint, or the unique characteristics of the fingerprint, is compared to reference data, such as a reference fingerprint image. The identity of the person is obtained or verified when the newly captured fingerprint image matches the reference fingerprint image.

Biometric sensing devices that image fingerprints or other biometric data can be subject to noise and other errors, such as signal fixed pattern noise. In some situations, the amount of the signal fixed pattern noise and a pattern or shape of the signal fixed pattern noise can change with the signal level. Signal fixed pattern noise can reduce the dynamic range of the biometric sensing device and produce inaccurate or indefinite biometric images or data.

SUMMARY

Embodiments described herein compensate for noise in a biometric image using at least two calibration images. The noise can include signal fixed pattern noise. Each calibration image can characterize the noise of a biometric sensing device at a particular signal level. The terms "image" and "biometric image" are meant to encompass an image, a composite image, and other types of data that can be captured by a biometric sensing device. In one aspect, a system can include a processing device and a biometric sensing device operatively connected to the processing device. The processing device can be configured to remove noise in a biometric image captured by the biometric sensing device using a first calibration image and a second calibration image. The first calibration image can characterize noise of the biometric sensing device at a first signal level. The second calibration image can characterize noise of the biometric sensing device at a different second signal level.

As one example, the noise can be removed on a segment-by segment basis using interpolation, where each segment of the biometric image can be acquired by a single sensing element. As another example, the biometric image can be divided into blocks and noise removed from each individual block separately by applying a fitting function to the blocks. Any suitable fitting function can be used, such as, for example, a least squares fitting function.

In another aspect, a method for capturing calibration images on a biometric sensing device can include applying a first signal level to the biometric sensing device and capturing a first calibration image based on the first signal level. The first calibration image characterizes noise of the biometric sensing device at the first signal level. A second signal level can be applied to the biometric sensing device and a second calibration image captured based on the second signal level. The second calibration image characterizes noise of the biometric sensing device at the second signal level.

In yet another aspect, a method for removing noise from a biometric image captured by a biometric sensing device can include capturing the biometric sensing device and receiving first and second calibration images. The first calibration image can characterize noise of the biometric sensing device at a first signal level. The second calibration image may characterize noise of the biometric sensing device at a different second signal level. Noise in the biometric image can be removed using the first calibration image and the second calibration image. For example, the noise can be removed from the biometric image on a sensing element-by-sensing element basis or on an image block-by-image block basis.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein compensate for signal fixed pattern noise in a biometric image using at least two calibration images. Each calibration image can characterize the noise of a biometric sensing device at a particular signal level. Noise can be removed from a newly captured biometric image using at least a first calibration image that characterizes noise produced by the biometric sensing device at a first signal level and a second calibration image that characterizes noise at a different second signal level.

In some embodiments, the biometric image can be divided into blocks, with the noise being removed from each individual block. As one example, the noise in each block can be removed by applying a fitting function to the block with the first and second calibration images. In other embodiments, the noise can be removed from the biometric image on a sensing element by sensing element basis. Thus, the noise is removed on a segment of the biometric image that was captured by each individual sensing element in the biometric sensing device. For example, the noise in a segment of the biometric image that has a signal level that substantially matches the signal level of the first calibration image can be removed by interpolating between the first calibration image and the biometric image. Similarly, the noise in another segment of the biometric image that has a signal level that substantially matches the signal level of the second calibration image can be removed by interpolating between the second calibration image and the biometric image.

Any suitable type of biometric sensing device can be included in, or connected to an electronic device. A person's fingerprint, eye, DNA, vein patterns, typing speed or patterns, gait, voice, face, and heart or brain signals are examples of a physical characteristic or a behavioral trait that can be detected or imaged by a biometric sensing device. A biometric sensing device can employ capacitance, ultrasonic, optical, resistive, thermal, or other sensing technologies to detect or image a biometric attribute. The term "biometric attribute" is meant to encompass a physical or behavioral trait that can be detected by a biometric sensing device.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with layers of a display or device, the directional terminology is intended to be construed broadly, and therefore should not be interpreted to preclude the presence of one or more intervening layers or other intervening features or elements. Thus, a given layer that is described as being formed, positioned, disposed on or over another layer, or that is described as being formed, positioned, disposed below or under another layer may be separated from the latter layer by one or more additional layers or elements.

Figure 1:
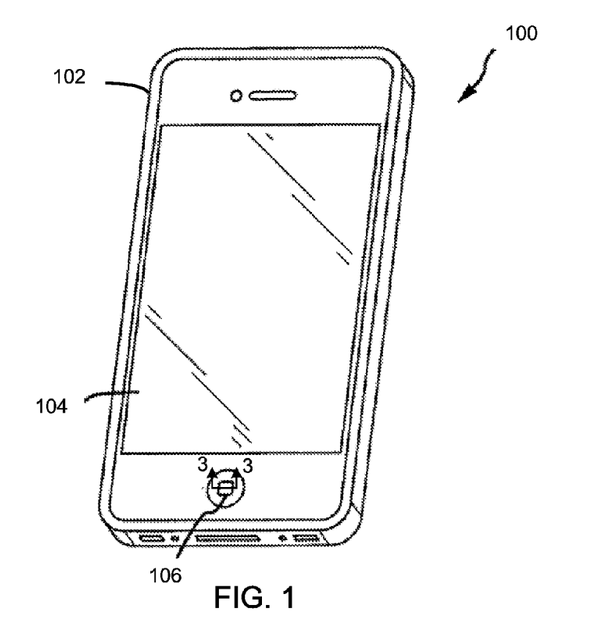
FIG. 1 is a perspective view of an example electronic device that can include or be connected to a biometric sensing device.

Referring now to FIG. 1, there is shown a perspective view of one example of an electronic device that can include, or be connected to a biometric sensing device. In the illustrated embodiment, the electronic device 100 is implemented as a smart telephone. Other embodiments can implement the electronic device differently, such as, for example, as a laptop or desktop computer, a tablet computing device, a gaming device, a display, a digital music player, a wearable computing device or display, and other types of electronic devices that can acquire and/or receive biometric data from a biometric sensing device.

The electronic device 100 includes an enclosure 102 at least partially surrounding a display 104 and one or more buttons 106 or input devices. The enclosure 102 can form an outer surface or partial outer surface and protective case for the internal components of the electronic device 100, and may at least partially surround the display 104. The enclosure 102 can be formed of one or more components operably connected together, such as a front piece and a back piece. Alternatively, the enclosure 102 can be formed of a single piece operably connected to the display 104.

The display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. The button 106 can take the form of a home button, which may be a mechanical button, a soft button (e.g., a button that does not physically move but still accepts inputs), an icon or image on a display, and so on. Further, in some embodiments, the button 106 can be integrated as part of a cover glass of the electronic device.

One or more biometric sensing devices can be included in, or connected to the electronic device 100. In one embodiment, the button 106 can include a biometric sensing device. As one example, a fingerprint sensor can be integrated in the button. Additionally or alternatively, a biometric sensing device can be included in a portion of the display, or in the entire display. And in some embodiments, the enclosure 102 can include one or more biometric sensing devices, such as a fingerprint sensor, a thermal sensor, and a microphone that can be used in conjunction with a voice recognition application.

Figure 2:
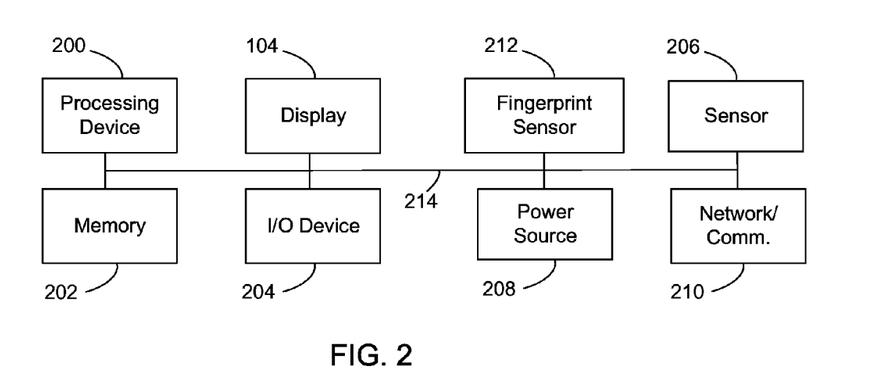
FIG. 2 is an illustrative block diagram of the electronic device 100 shown in FIG. 1.

FIG. 2 is an illustrative block diagram of the electronic device 100 shown in FIG. 1. The electronic device 100 can include the display 104, a processing device 200, memory 202, an input/output (I/O) device 204, a sensor 206, a power source 208, a network communications interface 210, and a biometric sensing device 212. The display 104 may provide an image or video output for the electronic device 100. The display may also provide an input region for one or more input devices, such as, for example, a touch sensing device and/or a fingerprint sensor. The display 104 may be substantially any size and may be positioned substantially anywhere on the electronic device 104.

The processing device 200 can control some or all of the operations of the electronic device 100. The processing device 200 can communicate, either directly or indirectly, with substantially all of the components of the electronic device 100. For example, a system bus or signal line 214 or other communication mechanisms can provide communication between the processing device 200, the memory 202, the I/O device 204, the sensor 206, the power source 208, the network communications interface 210, and/or the biometric sensing device 212. The processing device 200 can be implemented as any electronic device capable of processing, receiving, or transmitting data or instructions. For example, the processing device 200 can be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 202 can store electronic data that can be used by the electronic device 104. For example, a memory can store electrical data or content such as, for example, audio and video files, documents and applications, device settings and user preferences, timing signals, biometric images, data structures or databases, and so on. The memory 202 can be configured as any type of memory. By way of example only, the memory can be implemented as random access memory, read-only memory, Flash memory, removable memory, or other types of storage elements, or combinations of such devices.

The I/O device 204 can transmit and/or receive data to and from a user or another electronic device. One example of an I/O device is button 106 in FIG. 1. The I/O device(s) 204 can include a display, a touch sensing input surface such as a trackpad, one or more buttons, one or more microphones or speakers, one or more ports such as a microphone port, and/or a keyboard.

The electronic device 100 may also include one or more sensors 206 positioned substantially anywhere on the electronic device 100. The sensor or sensors 206 may be configured to sense substantially any type of characteristic, such as but not limited to, images, pressure, light, touch, heat, movement, relative motion, biometric data, and so on. For example, the sensor(s) 208 may be an image sensor, a heat sensor, a light or optical sensor, an accelerometer, a pressure transducer, a gyroscope, a magnet, a health monitoring sensor, and so on.

The power source 208 can be implemented with any device capable of providing energy to the electronic device 100. For example, the power source 208 can be one or more batteries or rechargeable batteries, or a connection cable that connects the remote control device to another power source such as a wall outlet.

The network communication interface 210 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

The biometric sensing device 212 can be implemented as any suitable biometric sensor, scanner, and/or system. For example, the biometric sensing device can be a facial recognition device, an iris or retina scanner, a vein recognition device that can image the veins in a finger or palm, a facial biometrics scanner, and/or a thermal imaging scanner. Additionally, the biometric sensing device 212 can be implemented with any suitable sensing technology, including, but not limited to, capacitive, resistive, ultrasound, piezoelectric, and thermal sensing technology.

In embodiments described herein, including the embodiment shown in FIG. 1, the biometric sensing device can be a fingerprint sensor. A fingerprint sensing device can capture images one or more fingers, a portion of one or more fingers, and/or some or all of a palm or of a hand. In some embodiments, the fingerprint sensor is positioned at a location that a user's finger, fingers and/or hands are naturally in contact with as the user interacts with the electronic device. For example, an electronic device can include a fingerprint sensor in the display 104, the button 106, the enclosure 102, and/or as a separate electronic device that is connected to the electronic device 100.

As used herein, the terms "image" and "biometric image" includes an image, a composite image formed with multiple images, and other types of data that can be captured by a biometric sensing device. The term "fingerprint image" includes an image, a composite image, and other types of data that can be captured by a fingerprint sensor. By way of example only, a fingerprint sensor can produce a data structure that defines the features in a fingerprint. Additionally, the term "fingerprint image" is meant to encompass an image or other data relating to a fingerprint of some or all of one or more fingers, some or all of a palm, some or all of a hand, and various combinations thereof. The term "finger" is meant to encompass one or more fingers, some or all of a palm, some or all of a hand, and various combinations thereof.

It should be noted that FIGS. 1 and 2 are illustrative only. In other examples, an electronic device may include fewer or more components than those shown in FIGS. 1 and 2.

Figure 3:
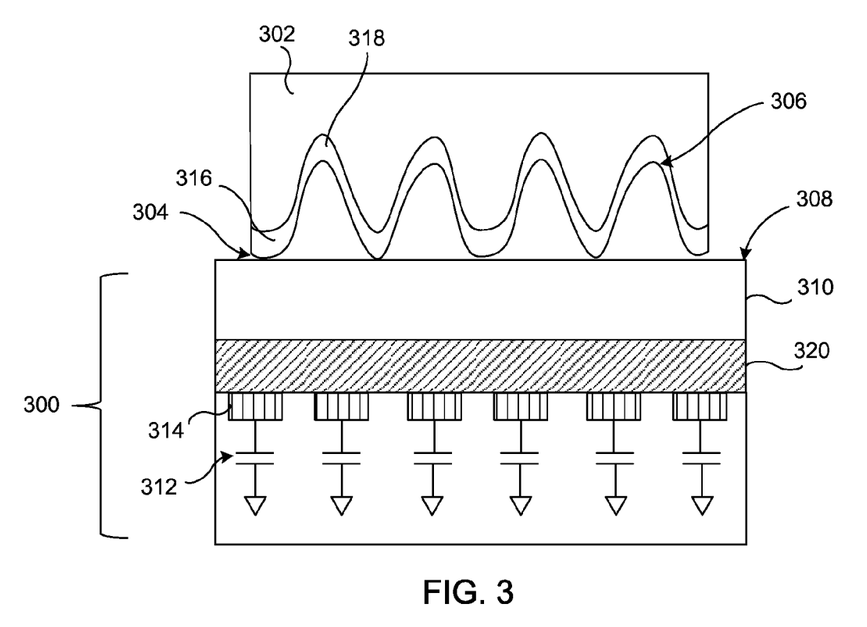
FIG. 3 depicts an enlarged and simplified cross-sectional view of a portion of a fingerprint sensor taken along line 3-3 in FIG. 1.

An example construction of a capacitive fingerprint sensor and how the capacitive fingerprint sensor captures a fingerprint will now be briefly described. FIG. 3 illustrates an enlarged and simplified cross-sectional view of a portion of a fingerprint sensor taken along line 3-3 in FIG. 1. A first layer 310 can be disposed over a dielectric layer 320. By way of example only, the first layer 310 can be a dielectric layer such as an exterior surface of a button or other input device (e.g., button 106 in FIG. 1), an exterior surface of an input device such as a trackpad or mouse, and/or a cover glass of a display (e.g., display 104 in FIG. 1). In some embodiments, the dielectric layer 320 can be a color layer that can be used to reduce the visibility of the electrodes and other circuitry of the fingerprint sensor.

The capacitive fingerprint sensor 300 can capture a fingerprint image of at least a portion of the finger 302 by measuring capacitance differences between the finger 302 and the electrodes 314. A fingerprint is generally formed from ridges 304 and valleys 306 arranged in a unique pattern. Typically, the capacitance measured between a ridge 304 and one or more electrodes 314 varies from the capacitance measured between a valley 306 and one or more electrodes 314. The measured capacitance between a ridge and an electrode can be greater than the measured capacitance between a valley and an electrode because the ridge is closer to the electrode. The differences in the measured capacitances can be used to distinguish between ridges and valleys and produce a fingerprint image.

The skin on the finger 302 includes a dead skin layer 316 disposed over a live skin layer 318. The capacitive fingerprint sensor 300 typically images the dead skin layer 316 to obtain an image of the fingerprint. However, if a portion of the dead skin layer 316 is damaged or missing, the capacitive fingerprint sensor can obtain an image of the fingerprint by imaging the live skin layer 318 by itself, or by imaging both the remaining dead skin layer 316 and the exposed live skin layer 318.

Figure 4:
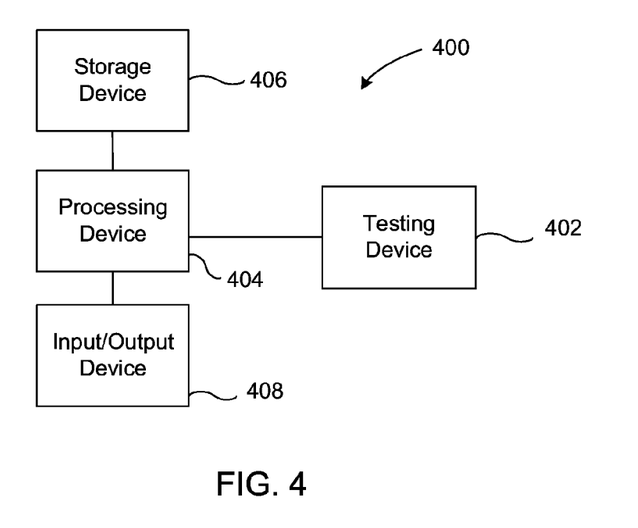
FIG. 4 is a block diagram of a testing system for a biometric sensing device.

Referring now to FIG. 4, there is shown a block diagram of a testing system for a biometric sensing device. The testing system 400 can include a testing device 402 operatively connected to one or more processing devices 404, one or more storage devices 406, and one or more input/output (I/O) device(s) 408. The processing device(s) 404 can communicate, either directly or indirectly, with substantially all of the components of the testing system 400. The processing device or devices can control some or all of the operations of the testing device 402, receive and process test data from the testing device, and store the test data or operational and control data for the testing device 402 in the storage device 406. The processing device(s) 404 can be implemented as any electronic device capable of processing, receiving, or transmitting data or instructions. For example, the one or more processing devices 404 can be a microprocessor, a central processing unit (CPU), an application-specific integrated circuit (ASIC), a digital signal processor (DSP), or combinations of multiple such devices. As described herein, the term "processing device" is meant to encompass a single processor or processing unit, multiple processors, multiple processing units, or other suitably configured computing element or elements.

The storage device(s) 406 can store electronic data that can be used by the testing system 400. For example, a storage device can store electrical data or content such as, for example, test signals and timing signals for the testing device and test data produced by the uniformity tests of one or more layers to be positioned over a capacitive sensing device. Additionally or alternatively, the storage device 406 can store compensation values that are determined for the capacitive sensing device during or after the layer or layers have been tested. The storage device(s) 406 can be configured as any type of memory. By way of example only, the memory can be implemented as random access memory, read-only memory, Flash memory, removable memory, or other types of storage elements, in any combination. The memory can be included in the testing system, in the electronic device that includes the biometric sensing device, and/or in another electronic device operatively connected to the electronic device. For example, the storage device can be a server that is connected to the testing system and/or to the electronic device that includes the capacitive sensing device through any wired or wireless connection.

The input/output device(s) 408 can receive data from a user or one or more other electronic devices. Additionally, the input/output device(s) 408 can facilitate transmission of data to a user or to other electronic devices. For example, the I/O device 408 can transmit electronic signals via a wireless or wired connection. Examples of wireless and wired connections include, but are not limited to, WiFi, Bluetooth, IR, and Ethernet. Additionally, the I/O device(s) 408 can include a display that displays information relating to the testing device 402 the tests performed by the testing device, and/or the test results produced by the testing device 402.

In some embodiments, at least some of the noise produced by a biometric sensing device, such as the signal fixed pattern noise in a capacitive fingerprint sensor, does not scale or increase linearly with respect to the signal level. The noise can change in amount and/or shape with respect to the signal level. Thus, in these embodiments, at least some of the noise produced by the biometric sensing device is compensated for using calibration images captured at different signal levels.

Figure 5:
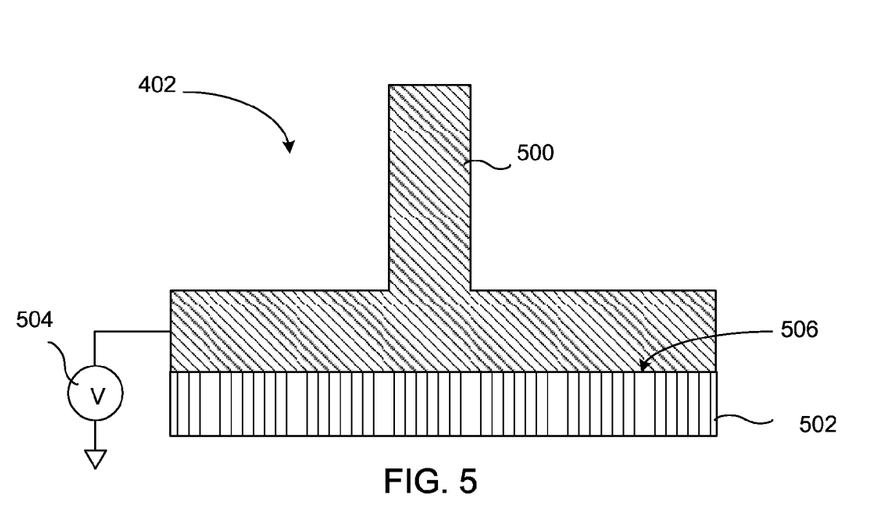
FIG. 5 is depicts a portion of the testing device 402 shown in FIG. 4.

FIG. 5 is depicts a portion of the testing device 402 shown in FIG. 4. The testing device 402 can include a test probe 500 disposed over a biometric sensing device 502. The biometric sensing device 502 can be constructed as any suitable biometric sensing device. In some embodiments, the biometric sensing device can be implemented as the capacitive sensing device illustrated in FIG. 3.

In the embodiment illustrated in FIG. 5, noise, including signal fixed pattern noise, is characterized by capturing calibration images at different signal levels. The test probe 500 is operatively connected to one terminal of a power supply 504. The other terminal of the power supply 504 can be operatively connected to a reference voltage, such as ground. The power supply can be an alternating current (AC) or direct current (DC) power supply. The test probe 500 can have a substantially flat conductive test surface 506 that can be disposed over, or placed in contact with the top surface of a capacitive sensing device 502.

Figure 6:
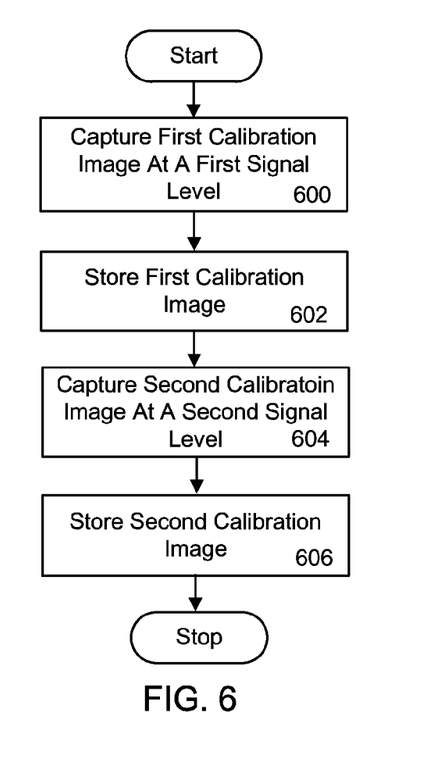
FIG. 6 is a flowchart of a method for acquiring two or more calibration images for a biometric sensing device.

A method for acquiring different calibration images is now described with reference to FIGS. 5 and 6. The test probe 500 may apply a first signal level (e.g., a first voltage level) to the capacitive sensing device 502 and the capacitances between the test probe 500 and one or more electrodes in the capacitive sensing device 502 can be measured. The measured capacitances produce a first calibration image (block 600 in FIG. 6). The first calibration image characterizes the noise produced by the capacitive sensing device 502 at the first signal level. The first calibration image can be stored in a memory, such as memory 202 in FIG. 2 (block 602).

The test probe 500 can then apply a second signal level that is different from the first signal level to the capacitive sensing device 502. In some embodiments, a different test probe can be used to apply the second signal level. The second test probe can include a flat conductive surface that is disposed over the top surface of the capacitive sensing device. A second calibration image is captured by measuring the capacitances between the test probe 500 and the capacitive sensing device 502 (block 604). The second calibration image characterizes the noise produced by the capacitive sensing device 502 at the second signal level. The second calibration image can then be stored in the memory (block 606) and the method ends.

Figure 7:
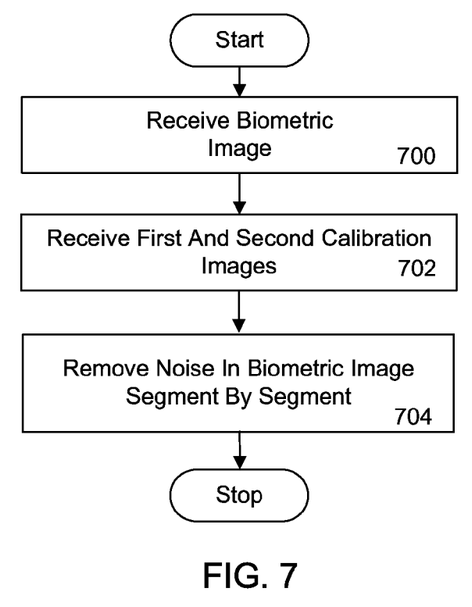
FIG. 7 is a flowchart of one method for reducing noise in a biometric image using different calibration images.

FIG. 7 is a flowchart of one method for reducing noise in a biometric image using different calibration images. Initially, a biometric image can be captured by the biometric sensing device and received by a processing device (block 700). First and second calibration images can then be received at block 702. The first and second calibration images can be produced using the method shown in FIG. 6. In one embodiment, the newly captured biometric image, the first calibration image, and the second calibration image can be received by the processing device 200 in FIG. 2.

Next, as shown in block 704, some or all of the noise can be removed from the biometric image on a segment-by-segment basis. A segment can represent the portion of a biometric image that was captured by an individual sensing element in the biometric sensing device. As one example, an individual sensing element is represented by a single capacitor 312 in the fingerprint sensor shown in FIG. 3. The method ends after noise is removed from the biometric image.

In one embodiment, some or all of the noise is removed from each segment using interpolation. For each segment, the signal level at that segment (e.g., the voltage of a representative capacitor 312) is compared to the signal levels at corresponding segment locations in the first and second calibration images to determine how close the signal levels in the first and second calibration images are to the signal level in the segment of the biometric image. This comparison can be expressed with the following equation:

$$\Lambda = B(X,Y) - C1(X,Y) / C2(X,Y) - C1(X,Y) \quad \text{(Equation 1)}$$

where B represents the signal level (e.g., voltage) at a location (X, Y) of a segment in the biometric image, C1 represents the signal level at the same location (X, Y) of a segment in the first calibration image, C2 represents the signal level at the same location (X, Y) of a segment in the second calibration image, and lambda ($\Lambda$) is a measure of distance of the signal level in the biometric image from the signal levels in the first and second calibration images. If $\Lambda$ equals zero, the signal level in the biometric image at (X, Y) matches the signal level at (X, Y) in the first calibration image C1. If $\Lambda$ equals one, the signal level in the biometric image at (X, Y) matches the signal level at (X, Y) in the second calibration image C2. If $\Lambda$ is between zero and one, the signal level in the biometric image at (X, Y) is between the signal level at (X, Y) in C1 and the signal level at (X, Y) in C2.

Lambda ($\Lambda$) can be used to interpolate noise between C1 and C2. For example, the interpolation can be expressed as:

$$N = HC1(X,Y) * (1-\Lambda) + HC2(X,Y) * \Lambda \quad \text{Equation 2}$$

where N represents the noise, HC1(X, Y) represents a signal level in C1 at location (X, Y) after the application of a high-pass filter, and HC2(X, Y) represents a signal level in C2 at location (X, Y) after the application of a high-pass filter. N=HC1 if $\Lambda$ equals zero. N=HC2 if $\Lambda$ equals one. If $\Lambda$ is between zero and one, N will be a mix of HC1 and HC2.

Noise can be removed from the segment (X, Y) in the biometric image by scaling the signal level of the segment at location (X, Y) in the biometric image. Noise removal can be expressed as:

$$B(X,Y) = B(X,Y) / (1+N) \quad \text{Equation 3}$$

Figure 8:
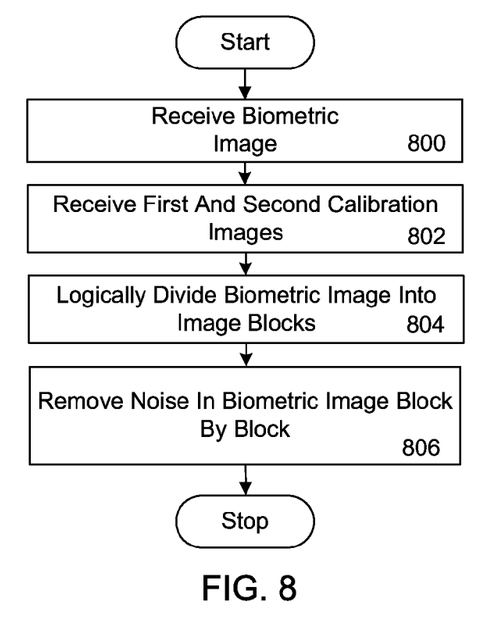
FIG. 8 is a flowchart of another method for reducing noise in a biometric image using different calibration images.

Referring now to FIG. 8, there is shown a flowchart of one method for reducing noise in a biometric image using different calibration images. Initially, a biometric image can be captured by the biometric sensing device and received by a processing device (block 800). First and second calibration images can then be received at block 802. The first and second calibration images can be produced using the method shown in FIG. 6. In one embodiment, the newly captured biometric image, the first calibration image, and the second calibration image can be received by the processing device 200 in FIG. 2.

Figure 9:
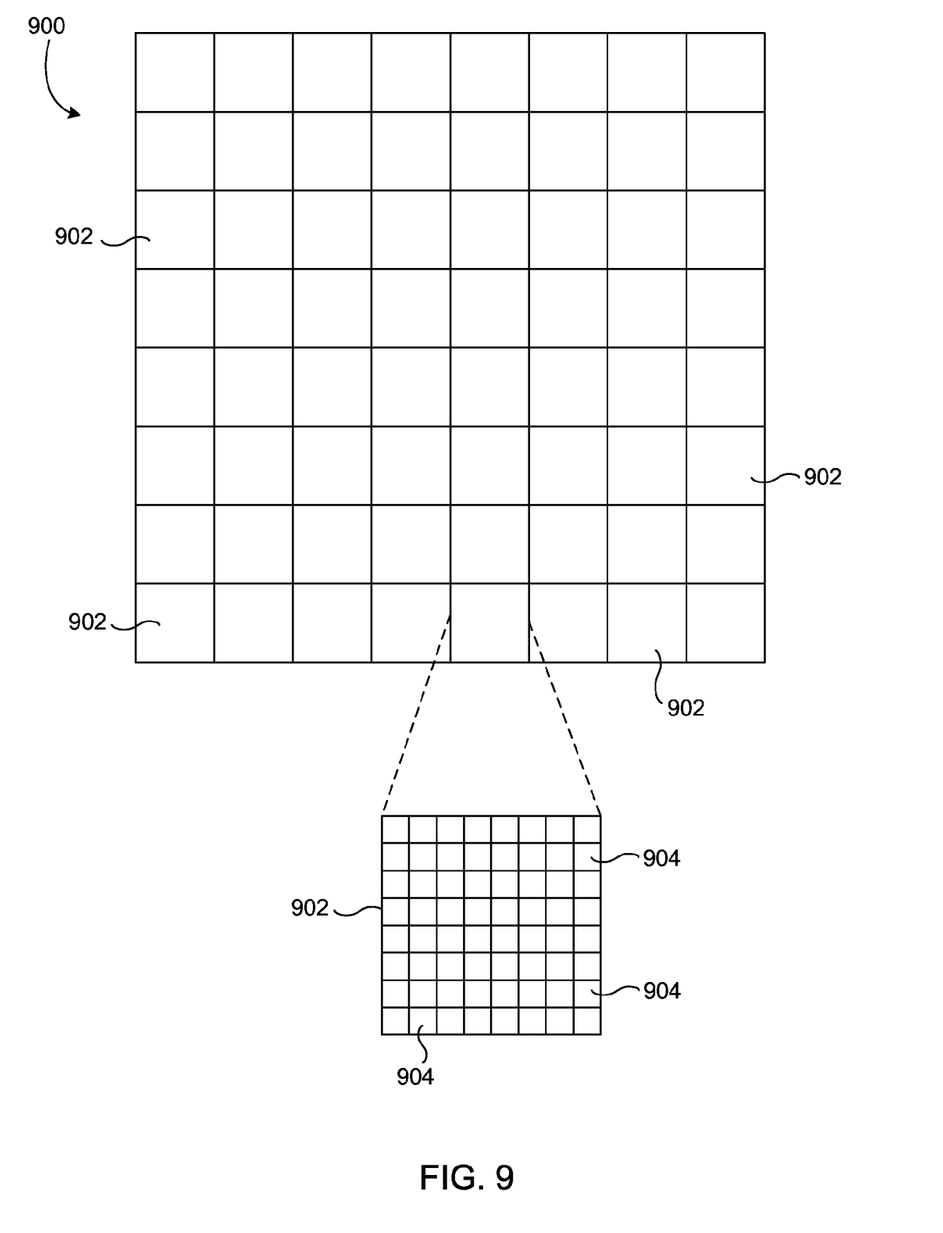
FIG. 9 illustrates a conceptual drawing of a fingerprint image logically divided into image blocks.

Next, as shown in block 804, the biometric image can be logically divided into image blocks. FIG. 9 illustrates a conceptual drawing of a biometric image logically divided into image blocks. The biometric image 900 can include multiple image blocks 902, each of which represents a section of the biometric image. Each image block 902 can include segments 904 of the biometric image 900 that have been captured by respective individual sensing elements in the biometric sensing device. By way of example only, a biometric image 900 can include eighty-eight by eighty-eight image blocks 902, and each image block 902 can include eight-by-eight segments 904. Thus, in one embodiment, a biometric image can include multiple image blocks, with each block representing a non-overlapping portion of the biometric image.

Returning again to FIG. 8, some or all of the noise in the biometric image can be removed image block-by-image block at block 806. Noise can be removed from each image block in a sequential process, such that noise is removed from one image block, then another image block, and so on. In one embodiment, noise can be removed using a fitting process, one such fitting process being a least squares fitting method. For each image block positioned at location (J, K) in the biometric image, a projection of HB(J, K) onto a linear spaced spanned by HC1(J, K) and HC2(J, K) is determined. HB represents a high-pass filtered signal level in the biometric image at location (J, K). In other words, two coefficients M and N may be determined such that $$HB(J,K) \approx M*HC1(J,K)+N*HC2(J,K) \quad \text{Equation 4}$$

The noise can be removed from the image block located at (J, K) in the biometric image using the equation $$B(J,K)=B(J,K)-(M*HC1(J,K)+N*HC2(J,K)) \quad \text{Equation 5}$$

The method ends after noise is removed from the biometric image. Those skilled in the art will appreciate that other techniques can be used to remove noise from the biometric image. For example, a different fitting process can be used.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A method for reducing noise in a biometric image that is captured by a biometric sensing device, the biometric sensing device comprising a plurality of electrodes, the method comprising:
   receiving the biometric image;
   logically dividing the biometric image into image blocks that each represent a non-overlapping portion of the biometric image, each non-overlapping portion representing capacitance values associated with two or more electrodes in the biometric sensing device; and
   for each image block, removing noise from the image block using at least one of a first calibration image and a second calibration image, wherein the first calibration image comprises first voltage levels that characterize noise of the biometric sensing device at a first voltage level and the second calibration image comprises second voltage levels that characterize noise of the biometric sensing device at a second voltage level.

2. The method as in claim 1, wherein noise is removed from the image blocks in the biometric image using a fitting function.

3. The method as in claim 2, wherein the fitting function comprises a least squares fitting function.

4. The method as in claim 1, wherein noise is removed from the image blocks in the biometric image using interpolation.

5. The method as in claim 1, wherein removing noise from each image block comprises removing noise on a segment-by-segment basis, each segment representing a portion of the biometric image associated with a respective electrode in the capacitive biometric sensing device.

6. The method as in claim 5, wherein noise is removed from each segment using interpolation.

7. The method as in claim 6, further comprising filtering the first and second calibration images with a high-pass filter prior to removing noise from each segment.

8. The method as in claim 7, wherein the interpolation is defined by an equation $N=HC1(X,Y)*(1-\Lambda)+HC2(X,Y)*\Lambda$, where N represents the noise, HC1(X, Y) represents a voltage level in the first calibration image at a location (X, Y) after the first calibration image is filtered by the high-pass filter, HC2(X, Y) represents a voltage level in the second calibration image at the location (X, Y) after the second calibration image is filtered by the high-pass filter, and $\Lambda$ represents a measure of a distance of a voltage level associated with the segment in the biometric image at the location (X, Y) from the voltage levels in the first and second calibration images at the location (X, Y).

9. The method as in claim 8, wherein $\Lambda$ is defined by an equation $\Lambda=(B(X,Y)-C1(X,Y))/(C2(X,Y)-C1(X,Y))$, where B represents the voltage level associated with the segment at the location (X, Y), C1 represents the voltage level at the location (X, Y) in the first calibration image, and C2 represents the voltage level at the location (X, Y) in the second calibration image.

10. A method for producing different calibration images for a capacitive biometric sensing device, the capacitive biometric sensing device comprising a plurality of electrodes, the method comprising:
    applying, by a conductive test surface of a first test probe, a first voltage level to a surface of the capacitive biometric sensing device;
    capturing a first calibration image based on the first voltage level, wherein the first calibration image represents first capacitance values between the conductive test surface of the first test probe and the plurality of electrodes in the capacitive biometric sensing device, the first calibration image characterizing noise of the capacitive biometric sensing device at the first voltage level;
    storing the first calibration image in a storage device;
    applying, by a conductive test surface of a second test probe, a second signal level to the surface of the capacitive biometric sensing device;

capturing a second calibration image based on the second voltage level, wherein the second calibration image represents second capacitance values between the conductive test surface of the second test probe and the plurality of electrodes in the capacitive biometric sensing device, the second calibration image characterizing noise of the capacitive biometric sensing device at the second voltage level; and storing the second calibration image in the storage device.

11. The method as in claim 10, wherein the first test probe and the second test probe comprise the same test probe.

12. A system, comprising:
a processing device; and
a capacitive biometric sensing device operatively connected to the processing device, wherein the processing device is configured to
logically divide a biometric image captured by the capacitive biometric sensing device into image blocks that each represent a non-overlapping portion of the biometric image, each non-overlapping portion representing capacitance values associated with two or more electrodes in the biometric sensing device; and
for each image block, remove noise from the image block using at least one of a first calibration image and a second calibration image, wherein the first calibration image represents first capacitance values that characterize noise of the capacitive biometric sensing device at a first voltage level and the second calibration image represents second capacitance values that characterize noise of the capacitive biometric sensing device at a second voltage level.

13. The system as in claim 12, further comprising a memory operatively connected to the processing device, wherein the memory stores the first and second calibration images.

14. The system as in claim 12, wherein the processing device is configured to remove noise from the biometric image using a fitting function.

15. The system as in claim 12, wherein the processing device is configured to remove noise using interpolation.

16. The system as in claim 12, wherein the processing device is configured to remove noise on a segment-by-segment basis within each image block, each segment representing a portion of the biometric image associated with a respective electrode in the capacitive biometric sensing device.

17. The system as in claim 16, wherein noise is removed from each segment using interpolation.

18. The system as in claim 17, further comprising a high-pass filter configured to filter the first and second calibration images.

19. The system as in claim 18, wherein the interpolation is defined by an equation $N=HC1(X,Y)*(1-\Lambda)+HC2(X,Y)*\Lambda$, where N represents the noise, $HC1(X, Y)$ represents a voltage level in the first calibration image at a location (X, Y) after filtering by the high-pass filter, $HC2(X, Y)$ represents a voltage level in the second calibration image at the location (X, Y) after filtering by the high-pass filter, and $\Lambda$ represents a measure of a distance of a voltage level associated with a segment in the biometric image at the location (X, Y) from the voltage levels in the first and second calibration images at the location (X, Y).

20. The system as in claim 19, wherein $\Lambda$ is defined by an equation $\Lambda=(B(X,Y)-C1(X,Y))/(C2(X,Y)-C1(X,Y))$, where B represents the voltage level of the segment at the location (X, Y), C1 represents the voltage level at the location (X, Y) in the first calibration image, and C2 represents the voltage level at the location (X, Y) in the second calibration image.

21. A method for reducing noise in a biometric image that is captured by a biometric sensing device, the biometric sensing device comprising a plurality of individual sensing elements, the method comprising:
receiving the biometric image;
receiving a first calibration image that characterizes noise of the biometric sensing device at a first signal level;
receiving a second calibration image that characterize the noise of the biometric sensing device at a second signal level; and
removing noise from the biometric image on a segment-by-segment basis, each segment representing a portion of the biometric image that is captured by a respective individual sensing element in the biometric sensing device, wherein removing the noise from the biometric image on the segment-by-segment basis comprises:
comparing a signal level of a respective segment in the biometric image to a first signal level at a corresponding segment location in the first calibration image to determine a first difference value;
comparing the signal level of the respective segment to a second signal level at a corresponding segment location in the second calibration image to determine a second difference value; and
adjusting the signal level of the respective segment based on the first and second difference values.

* * * * *